Oct. 27, 1964 D. WIELAND 3,154,444

METHOD OF FORMING P-N JUNCTIONS IN SILICON

Filed April 15, 1959

*INVENTOR.*
DIETER WIELAND

*BY* Francis L. Masselle
ATTORNEY

United States Patent Office 3,154,444
Patented Oct. 27, 1964

3,154,444
METHOD OF FORMING P-N JUNCTIONS IN SILICON

Dieter Wieland, Nurnberg, Germany, assignor to Clevite Corporation, Cleveland, Ohio, a corporation of Ohio
Filed Apr. 15, 1959, Ser. No. 806,533
Claims priority, application Germany Apr. 16, 1958
4 Claims. (Cl. 148—177)

This invention relates to a process for the preparation of p-n junctions in silicon by alloying with aluminum.

Aluminum as an alloying material is known to be very suitable for preparing of alloy junctions in silicon. Both the properties and the achieved geometry of the junction are good. In addition, the eutectic temperature, 577° C., of the aluminum-silicon alloy formed during alloying is well above the maximum operating temperatures of 180° to 280° C. encountered in service.

The techniques employed in the preparation of p-n junctions in silicon by alloying are largely the same as those used in connection with alloying of n-type germanium with indium. In the case of n-type germanium a thin indium-doped re-crystallization zone is formed on which the remainder of the melt produced at the alloying temperature solidifies as a polycrystalline mixture of indium and heavily indium-doped germanium. Since the eutectic of germanium-indium lies very close to pure indium, during slow cooling of the melt practically all dissolved germanium will crystallize out and will be available to form a relatively thick re-crystallization zone.

On the other hand the aluminum-silicon binary alloy system has a eutectic composition comprising about 12 weight percent silicon. Consequently, even during slow cooling of the melt not all of the dissolved silicon will crystallize out and, therefore, some silicon will not be available for the formation of a re-crystallization zone but will stay in the aluminum the amount remaining depending on the alloying temperature (e.g., when alloying at 650° C., 70% of the dissolved silicon will remain).

It has been found that the thickness of the recrystallization zone is, among others, one of the decisive factors in the fabrication of good quality semiconductor elements. In order to achieve good operating characteristics the re-crystallization zone must be relatively thick. For instance, only with proper thickness of the recrystallization zone is a satisfactory emitter efficiency (gamma) obtained (when using the p-n junction as an emitter of a transistor). The value of gamma in turn influences the current amplification, alpha, in the same sense.

Furthermore, if stresses in a semiconductor—even without resulting crack formation—influence the lifetime of the charge carrier, then care must be taken that these stresses, which reveal themselves chiefly as shear-stresses at the boundary metal-re-crystallization zone, are as remote from the p-n junction as possible. For the aforementioned reasons the re-crystallization zone must be made as thick as possible.

However, a re-crystallization zone of satisfactory strength cannot be attained using aluminum as the alloying agent for silicon according to conventional methods. Even with a very slow cooling rate there is a limit to the thickness of the re-crystallization zone which can be achieved due to the composition of the eutectic as described. At an alloying temperature of 650° C. in order to attain a re-crystallization zone of about 30 microns thickness, the alloying depth would have to be about 140 microns. For this an aluminum pill of about 0.75 millimeter thickness would be needed. At such depths, however, effective control of geometry, however, effective control of geometry, accurate to within a few microns, is no longer possible. In addition, alloying is not usually carried out as a quasi-equilibrium process; therefore, alloying time appears as an additional parameter of the alloying geometry. In order to attain a re-crystallization zone of usable thickness (i.e., of at least a few microns) the silicon concentration in the aluminum wire matched to the silicon surface must be as high as possible and this requires high alloying temperature; experience has shown that at an alloying temperature of 650° C., a re-crystallization zone thickness of 1–3 microns can be expected. In order to avoid excessive alloying depth at this relatively high temperature care must be exercised to prevent, insofar as possible, the mixing of the silicon rich alloy with the surplus aluminum present; this may be achieved to a tolerable degree by a very rapid heating and equally rapid cooling of the system. Nevertheless silicon diffusion into the aluminum wire is so extensive that the re-crystallization zone thickness is only about 10 to 50% of what it would have been without this diffusion.

Processes which seek to attain thick re-crystallization zones when alloying silicon with aluminum simply by reliance on high alloying temperatures to cause deep alloying are difficult to carry out and are relatively costly.

The present invention relates to a process for obtaining thicker re-crystallization zones in a silicon wafer without the difficulties outlined above.

According to the present invention a P-N junction in silicon is formed by alloying directly to a silicon wafer an alloying pellet consisting essentially of from 11.6% to 14% by weight silicon, with the balance aluminum, by heating the silicon wafer and alloying pellet to a temperature high enough to cause fusing and alloying, and then slowly reducing the temperature of the silicon wafer and alloy pellet assembly.

According to this invention the aluminum-silicon eutectic is used in the alloying pellet, preferably. When using the eutectic mixture—considering the phase diagram—the conditions are essentially the same as in the system indium-germanium; i.e., the whole of the silicon which dissolves during the alloying process crystallizes out again. Consequently, in order to produce a re-crystallization zone 30 microns thick, for example, an alloying depth of only 30 microns is required. The necessary alloying temperature is solely a function of the thickness of the alloying pill. For instance, at 650° C. a pill 0.6 mm. thick is necessary, at 700° C. the pill thickness is 1.35 mm.. Since the total alloying depth can be kept small, exact control of the thickness of the base layer is simple to obtain. Furthermore, the thickness of the pill as well as the alloying temperature are such that the alloying shape need not meet strict requirements. The wetting conditions, alloying geometry and quality of the re-crystallization zone correspond to alloying with pure aluminum.

Figure 1:
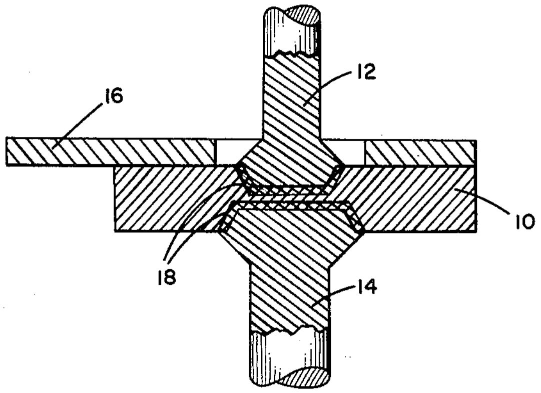
FIGURE 1 shows schematically and in section a conventional silicon transistor alloyed with pure aluminum.
Figure 2:
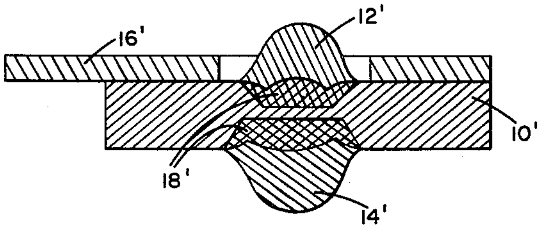
FIGURE 2 shows schematically and in section a silicon transistor, according to the present invention, alloyed with a pill consisting of the aluminum-silicon eutectic alloy.

Both transistors illustrated are of the usual design comprising, in FIGURES 1 and 2, respectively, silicon wafers 10, 10', with emitters 12, 12'; collectors 14, 14', and base connections 16, 16'. The emitter 12 and collector 14 of the transistor shown on FIGURE 1 consist of pure aluminum wire which was alloyed to the silicon wafer 10. The respective re-crystallization zones 18 are, as explained above, very thin. According to the present invention the transistor shown in FIGURE 2 has, on the other hand, for emitter 12' and for the collector 14' alloy pellets consisting of the aluminum-silicon eutectic.

As a result, the re-crystallization zones 18' are very thick and extend practically to the surface of the silicon wafer 10' owing to the constant supply of silicon from the pill to the re-crystallization zone.

According to the invention, the alloy pellets are produced by melting together for instance pure aluminum, say in the form of wire, with highly pure silicon in the eutectic ratio (11.6 wt. percent silicon) at about 950° C., using a small graphite boat for a container. After about fifteen minutes the alloy is homogeneous throughout and may be cooled slowly from 950° C. to 550° C. The bar obtained is vigorously etched in HF—$HNO_3$, cut up into pieces and then formed into plates of suitable thickness. It is advisable to heat the plates during the process several times to red heat so that the material remains ductile.

From these plates pills of about 0.5 diameter are stamped. These are subsequently melted down to spheres on a graphite plate which has small depressions. The spheres obtained have a diameter of about 0.57 millimeter and weigh approximately 0.25 mg. The alloying form contains conical cavities to accommodate these spheres. The volume of the conical cavities is somewhat larger than that of the spheres. In this way a satisfactory sintering is achieved. Since the volume of the conical cavities is greater than the volume of the sphere the pill material will not be squeezed out laterally. In order to keep the sphere in position during charging of the alloying form, a small amount of silicone oil may be used in the form or on the crystal. In this way wetting conditions are improved in addition. The crystals to be used are etched down to a thickness of about 70 microns. At an alloying temperature of 670° C. the base layer will have a thickness of about 10–15 microns. In order to obtain a satisfactory re-crystallization zone, cooling down has to proceed very slowly; in the temperature range of 670° C.–570° C. the rate 3–5 centigrade degrees per minute will prove to be adequate. Further cooling may be faster. The alloying is carried out preferably in high vacuum. However, alloying in a stream of hydrogen will also yield good results.

According to this invention with this process re-crystallization zones of about 40 microns thickness may be produced without difficulty. Consequently, transistors produced by this process are superior to other transistors as regards emitter efficiency and current amplification.

According to this invention, however, it is not essential that eutectic composition be observed accurately. For instance with up to 20% excess silicon over the eutectic, one may achieve that the re-crystallization zone grows above the silicon surface. However, with alloys having excess of components, work is more difficult than using pure eutectic composition. During the manufacture quenching is essential otherwise relatively large silicon crystals (up to 1 millimeter) will separate out and they will disturb homogeneity and render exceedingly difficult the preparation of the pills.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

I claim:

1. A method of forming P-N junctions in silicon comprising: placing in contact with the surface of a wafer of silicon an alloying pellet consisting essentially of 11.6 to 14 percent by weight silicon, balance aluminum; heating the silicon and alloying pellet to a substantially uniform temperature high enough to cause fusing and alloying; and then slowly reducing the temperature of the alloy pellet and wafer assembly.

2. A method according to claim 1 wherein said temperature is at least 670° C. and the temperature is reduced from about 670° C. to 570° C. at the rate of 3 to 5 centigrade degrees per minute.

3. A method of forming P-N junctions in silicon comprising placing in surface contact with a wafer of silicon an alloying pellet consisting essentially of the eutectic alloy of aluminum and silicon; heating the silicon and alloying pellet so disposed to a substantially uniform temperature of about 670° C. and maintaining said temperature until alloying is accomplished; and then reducing the temperature of the alloyed wafer and pellet assembly from 670° C. to 570° C. at a rate of about 3 to 5 centigrade degrees per minute.

4. A method according to claim 3 wherein surfaces in contact with said alloying body are coated with silicone oil.

References Cited in the file of this patent

UNITED STATES PATENTS

| | | |
|---|---|---|
| 2,599,984 | Fletcher et al. | June 10, 1952 |
| 2,821,493 | Carman | Jan. 28, 1958 |
| 2,881,103 | Brand et al. | Apr. 7, 1959 |
| 2,887,415 | Stevenson | May 19, 1959 |
| 2,932,594 | Mueller | Apr. 12, 1960 |

FOREIGN PATENTS

| | | |
|---|---|---|
| 537,909 | Canada | Mar. 5, 1957 |